(12) United States Patent
Lin (10) Patent No.: US 9,958,982 B2
(45) Date of Patent: May 1, 2018

(54) TOUCH DEVICES AND CONTROL METHODS THEREFOR

(71) Applicant: Acer Incorporated, New Taipei (TW)

(72) Inventor: Jiunn-Jou Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 189 days.

(21) Appl. No.: 14/692,260

(22) Filed: Apr. 21, 2015

(65) Prior Publication Data

US 2016/0231848 A1 Aug. 11, 2016

(30) Foreign Application Priority Data

Feb. 10, 2015 (TW) .............................. 104104339 A (51) Int. Cl.
  *G06F 3/041* (2006.01)
  *G06F 1/32* (2006.01)

(52) U.S. Cl.
  CPC .......... *G06F 3/0416* (2013.01); *G06F 1/3262* (2013.01); *G06F 2203/04104* (2013.01)

(58) Field of Classification Search
  CPC ......... G06F 2203/04104; G06F 1/3262; G06F 3/0416; G06F 2203/04106
  See application file for complete search history.

(56) References Cited

U.S. PATENT DOCUMENTS

| 8,884,917 | B2 | 11/2014 | Seo | |
|---|---|---|---|---|
| 2009/0251427 | A1* | 10/2009 | Hung | G06F 3/0416 345/173 |
| 2012/0169660 | A1* | 7/2012 | Seo | G06F 1/3262 345/174 |
| 2013/0015906 | A1* | 1/2013 | Yeh | G06F 3/044 327/517 |
| 2013/0016051 | A1 | 1/2013 | Yeh | |
| 2014/0327627 | A1 | 11/2014 | Deussen et al. | |

FOREIGN PATENT DOCUMENTS

| TW | 200943156 | 10/2009 |
|---|---|---|
| TW | 201124886 | 7/2011 |
| TW | 201227482 | 7/2012 |
| TW | 201303671 | 1/2013 |

OTHER PUBLICATIONS

Chinese language office action dated Jul. 7, 2016, issued in application No. TW 104104339.

* cited by examiner

*Primary Examiner* — Abhishek Sarma
(74) *Attorney, Agent, or Firm* — McClure, Qualey & Rodack, LLP (57) ABSTRACT

A touch device is provided. The touch device includes a touch panel, a first control circuit, and a second control circuit. The touch panel is divided into a first touch area and a second touch area. The first control circuit is coupled to the first touch area and performs a first touch-detection operation on the first touch area. The second control circuit is coupled to the second touch area and performs a second touch-detection operation on the second touch area.

17 Claims, 6 Drawing Sheets

TOUCH DEVICES AND CONTROL METHODS THEREFOR

CROSS REFERENCE TO RELATED APPLICATIONS

This application claims priority of Taiwan Patent Application No. 104104339, filed on Feb. 10, 2015, the entirety of which is incorporated by reference herein.

BACKGROUND OF THE INVENTION

Field of the Invention

The invention relates to a touch device which has multiple control circuits for controlling different areas on a touch panel, and thus the areas can respectively operate in a normal state or in a power-saving mode, thereby saving power.

Description of the Related Art

Figure 1:
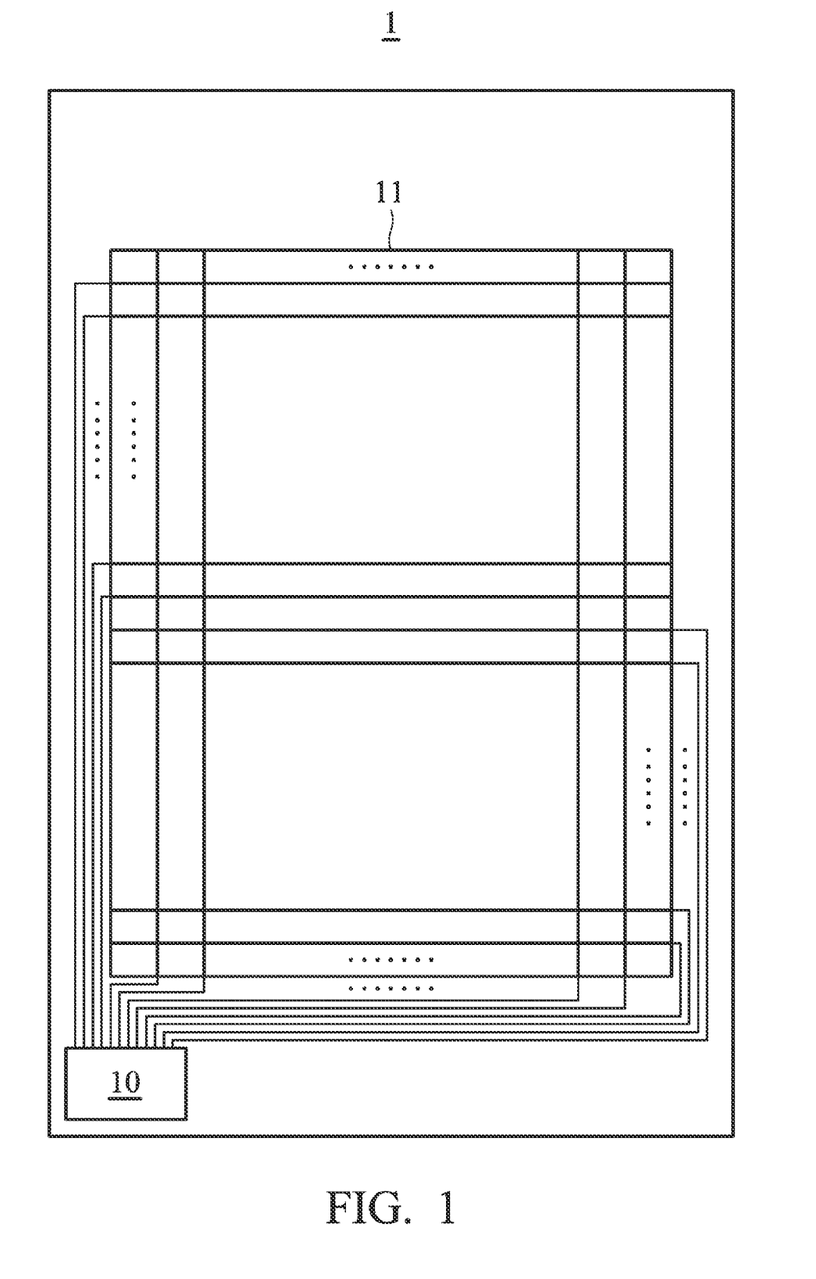
FIG. 1 shows a touch device with one single control integrated circuit.

Recently, in order to enhance visual enjoyment for users of portable electronic devices, such portable electronic devices have been developed to have high resolution and large panels. As shown in FIG. 1, a conventional portable electronic device has one single control integrated circuit 10, which is used to control the touch detection of the panel 11. To achieve real-time report-and-response for touch detection, the control integrated circuit 10 has to adopt a high frequency to perform scans and touch-detection operations, however this results in increased power consumption during the touch-detection operation of the portable electronic device. For touch devices with large panels, the power consumed by touch-detection operations can be great.

BRIEF SUMMARY OF THE INVENTION

Thus, it is desirable to provide a touch device in which different areas can be controlled respectively, thereby saving power and lengthening standby time.

An exemplary embodiment of a touch device is provided. The touch device comprises a touch panel, a first control circuit, and a second control circuit. The touch panel is divided into a first touch area and a second touch area. The first control circuit is coupled to the first touch area and performs a first touch-detection operation on the first touch area. The second control circuit is coupled to the second touch area and performs a second touch-detection operation on the second touch area.

An exemplary embodiment of a control method for a touch device is provided. The control method comprises the steps of dividing a touch panel of the touch device into a first touch area and a second touch area; performing a first touch-detection operation on the first touch area through a first control circuit; and performing a second touch-detection operation on the second touch area through a second control circuit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
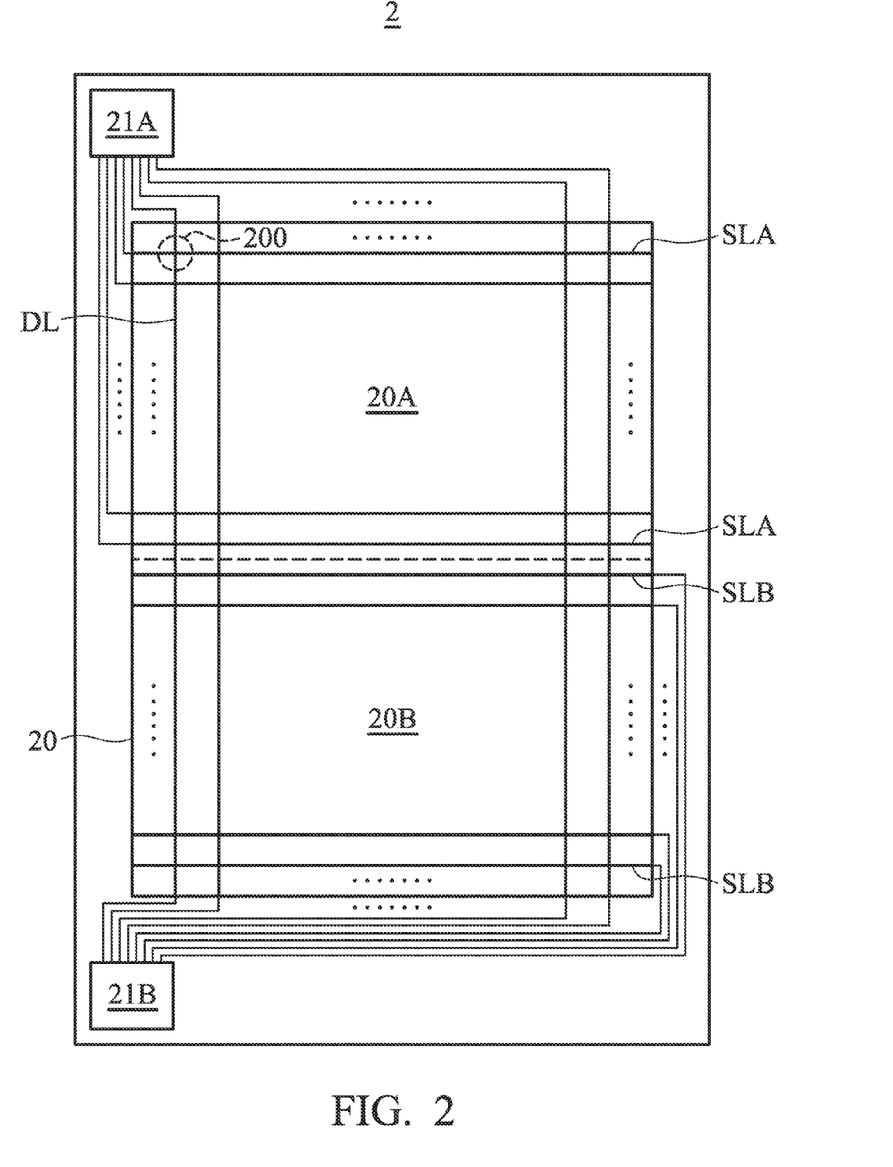
FIG. 2 shows one exemplary embodiment of a touch device.

In an exemplary embodiment of a touch device in FIG. 2, a touch device 2 comprises a touch panel 20 and two control circuits 21A and 21B. The touch panel 20 is divided into two touch areas 20A and 20B. The control circuit 21A performs a scanning operation through scan lines SLA to control pixel cells 200 of the touch area 20A and further reads signals from the pixel cells 200 of the touch area 20A through data lines DL. The control circuit 21B performs a scanning operation through scan lines SLB to control pixel cells 200 of the touch area 20B and further reads signals from the pixel cells 200 of the touch area 20B through the data lines DL. In the schematic figure FIG. 2, to clearly show the connection relationship between the touch areas 20A and 20B and the control circuits 21A and 21B, the control circuits 21A and 22B are respectively drawn above and under the touch device 2. In practice, the control circuits 21A and 22B can be disposed in other locations, such as the rear of the touch panel 20. Moreover, the sizes of the touch areas 20A and 20B shown FIG. 2 are used as an example. In practice, the sizes of the touch areas 20A and 20B are determined according to system requirements.

Figure 3:
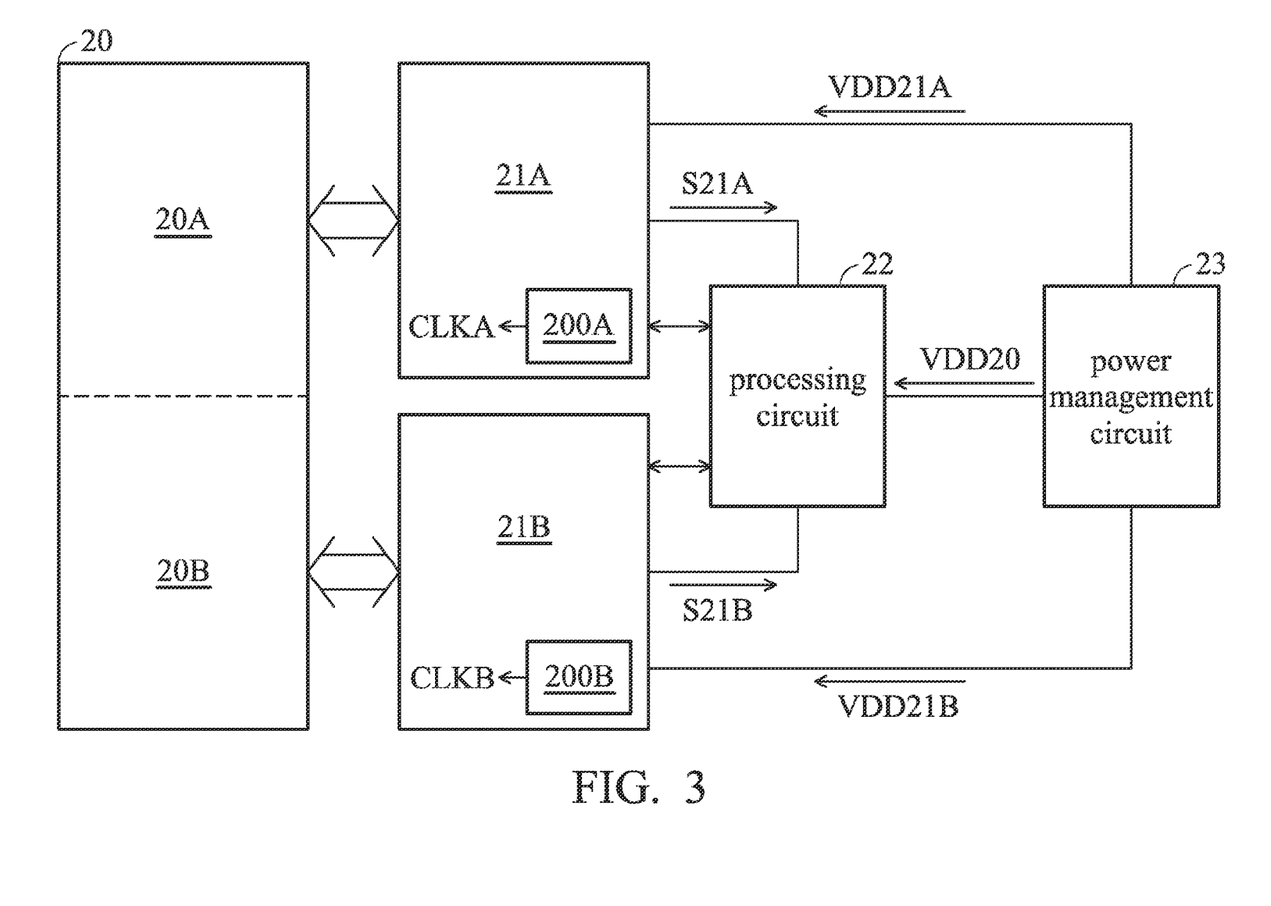
FIG. 3 shows another exemplary embodiment of a touch device.

Referring to FIG. 3, the touch device 2 comprises the touch panel 20 and the control circuit 21A and 21B, and the touch device 2 further comprises a processing circuit 22 and a power management circuit 23. The processing circuit 22 is coupled to the control circuits 21A and 21B to control the control circuits 21A and 21B. The power management circuit 23 generates a voltage VDD20 for the processing circuit 22 to serve as the operation voltage of the processing circuit 22. The power management circuit 23 also generates voltages VDD21A and VDD21B for the control circuits 21A and 21B to serve as the operation voltages of the control circuits 21A and 21B, respectively. The control circuit 21A performs a touch-detection operation on the touch area 20A through the scan lines SLA in response to the controlling of the processing circuit 22. The control circuit 21B performs a touch-detection operation on the touch area 20B through the scan lines SLB in response to the controlling of the processing circuit 22. When the control circuit 21A detects that a touch event occurs in the touch area 20A, the control circuit 21A generates an interrupt signal S21A to the processing circuit 22, and the processing circuit 22 then determines the position where the touch event occurs in the area 20A according to signals transmitted between the processing circuit 22 and the control circuit 21A. Similarly, when the control circuit 21B detects that a touch event occurs in the touch area 20B, the control circuit 21B generates an interrupt signal S21B to the processing circuit 22, and the processing circuit 22 then determines the position where the touch event occurs in the area 20B according to signals transmitted between the processing circuit 22 and the control circuit 21B. After the processing circuit 22 determines the position where the touch event occurs, the processing circuit 22 performs a specific operation corresponding to the position, such as a display switching operation.

According to the embodiment, each of the control circuits 21A and 11B is independent of the other. In an embodiment, the control circuit 21A is packaged independently to form an integrated circuit, and the control circuit 21B is packaged independently to form another integrated circuit. In another embodiment, the control circuit 21A comprises a clock generator 200A which generates a clock signal CLKA to serve as a clock basis for touch detection of the control circuit 21A, and the control circuit 21B comprises another clock generator 200B which generates a clock signal CLKB to serve as a clock basis for touch detection of the control circuit 21B. In other words, each of the control circuits 21A and 21B comprises an independent clock generator.

As described above, the touch areas 20A and 20B are coupled to control circuits 21A and 21B, respectively. Thus, the control circuits 21A and 21B may respectively perform touch-detection operations on the touch areas 20A and 20B while in different modes. In an embodiment, the control circuits 21A and 21B respectively perform touch-detection operations on the touch areas 20A and 20B in a normal mode, or control circuits 21A and 21B respectively perform touch-detection operations on the touch areas 20A and 20B in a power-saving mode. In an alternative embodiment, one of the control circuits 21A and 21B performs the touch-detection operation on the corresponding touch area in the normal mode, while the other control circuit 21A or 21B performs the touch-detection operation on the corresponding touch area in the power-saving mode. Through the area division of the touch panel 20 and the independence of the control circuits 21A and 21B, one of the control circuits 21A and 21B can be flexibly operated in the power-saving mode in some cases, thereby decreasing power consumption and lengthening standby time.

In the embodiments, the recited power-saving mode may be an idle mode or a sleep mode. In an embodiment, for one control circuit, the scanning frequency of the touch-detection operation performed in the power-saving mode (the idle or sleep mode) is lower than the scanning frequency of the touch-detection operation performed in the normal mode. In addition to saving power by reducing the scanning frequency, power savings can also be achieved by controlling the number of scan lines (that is, the scanning density) which are scanned at the same time during the touch-detection operation. In another embodiment, for one control circuit, the scanning density of the touch-detection operation performed in the power-saving mode (the idle or sleep mode) is less than the scanning density of the touch-detection operation performed in the normal mode. In another embodiment, for one control circuit, both the scanning frequency and the scanning density of the touch-detection operation performed in the power-saving mode (the idle or sleep mode) are lower than the respective scanning frequency and scanning density of the touch-detection operation performed in the normal mode.

The following embodiments will describe a control method for the control circuits 21A and 21B operated in the normal mode or the power-saving mode.

Figure 4:
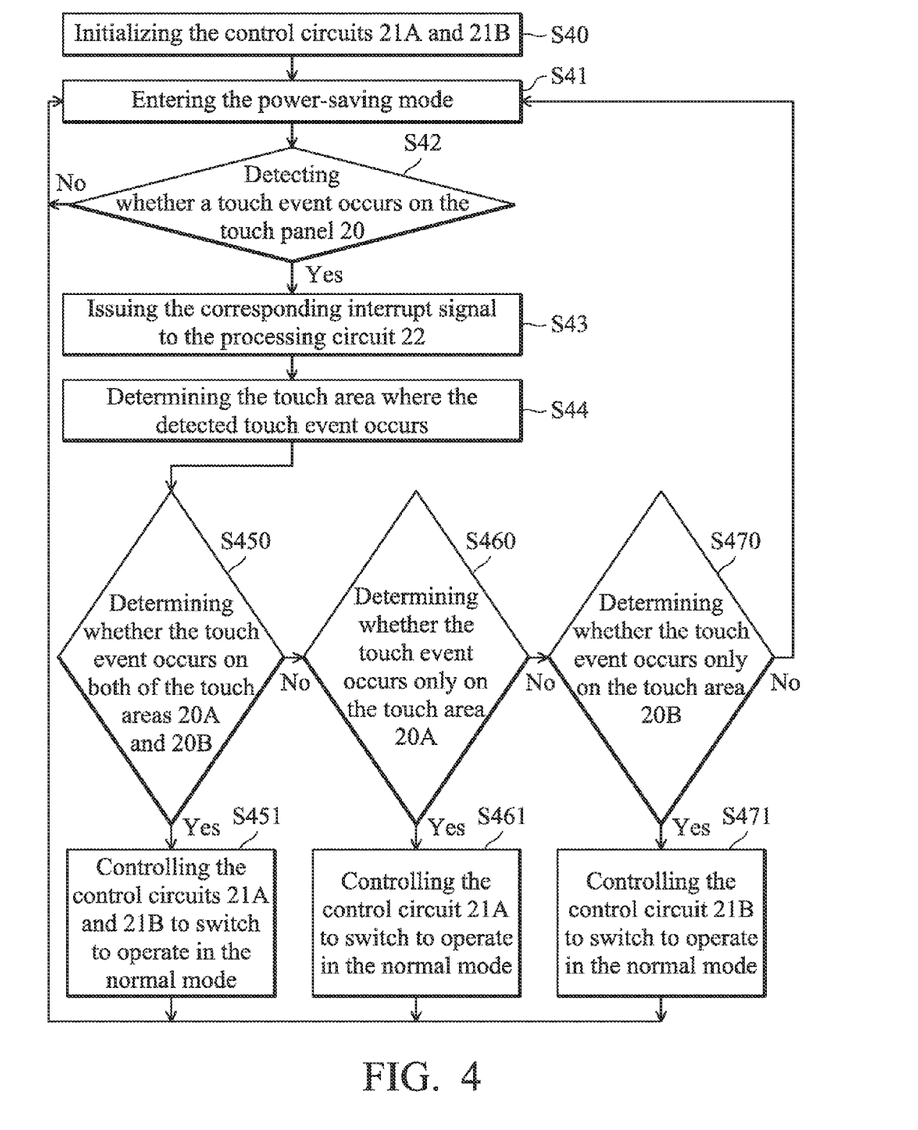
FIG. 4 shows one exemplary embodiment of a control method.

FIG. 4 shows one exemplary embodiment of a control method. The control method is illustrated in FIGS. 3 and 4. After the touch device 2 is powered on, the processing circuit 22 initializes the control circuits 21A and 21B (step S40). Then, both of the control circuits 21A and 21B enter the power-saving mode (the idle or sleep mode) (step S41). At this time, for detecting whether a touch event occurs on the touch panel 20, the control circuit 21A operated in the power-saving mode performs the touch-detection operation on the touch area 20A at a lower scanning frequency or a lower scanning density, and the control circuit 21B operated in the power-saving mode performs the touch-detection operation on the touch area 20B at a lower scanning frequency or a lower scanning density (step S42). When a touch event occurs on the touch panel 20, control circuit 21A and/or control circuit 21B issues the corresponding interrupt signal to the processing circuit 22 (step S43). Then, the processing circuit 22 determines the touch area where the detected touch event occurs according to the signals transmitted between the processing circuit 22 and control circuit 21A and/or control circuit 21B (step S44). When no touch event occurs on the touch panel 20, the control method proceeds to step S41.

Then, the processing circuit 22 determines whether the touch event occurs on both of the touch areas 20A and 20B (step S450). When the processing circuit 22 determines that the touch event occurs on both of the touch areas 20A and 20B, the processing circuit 22 controls the control circuits 21A and 21B to switch to operate in the normal mode (step S451). At this time, the control circuit 21B still operates in the power-saving mode. After the processing circuit 22 performs a corresponding operation according to the touched positions, the processing circuit 22 controls both of the control circuits 21A and 21B to switch back to the power-saving mode (the method proceeds to step S41).

When the processing circuit 22 determines that the touch event does not occur on both of the touch areas 20A and 20B, the processing circuit 22 determines whether the touch event occurs only on the touch area 20A (step S460). When the processing circuit 22 determines that the touch event occurs only on the touch area 20A, the processing circuit 22 controls the control circuit 21A to switch to operate in the normal mode (step S461). After the processing circuit 22 performs a corresponding operation according to the touched position, the processing circuit 22 controls the control circuit 21A to switch back to the power-saving mode (the method proceeds to step S41).

When the processing circuit 22 determines that the touch event does not occur only on the touch area 20A, the processing circuit 22 determines whether the touch event occurs only on the touch area 20B (step S470). When the processing circuit 22 determines that the touch event occurs only on the touch area 20B, the processing circuit 22 (step S471). At this time, the control circuit 21A still operates in the power-saving mode. After the processing circuit 22 performs a corresponding operation according to the touched position, the processing circuit 22 controls the control circuit 21B to switch back to the power-saving mode (the method proceeds to step S41).

According to the method described above, whether the control circuits 21A and 21B operate in the normal mode or the power-saving mode is determined according to the touched position(s). In other embodiments, when the processing circuit 22 performs a specific operation, the user may usually touch the touch panel 20 on one touch area according to the purpose of the specific operation. Thus, when the processing circuit 22 performs a specific operation, the processing circuit 22 may determine which touch area is the most frequently touched area according to the information related to the specific operation. The related information may have been previously stored in a memory of the processing circuit 22 or input externally. The most frequently touched area performs the touch-detection operation at a higher scanning frequency or a higher scanning density, while the other area(s) performs the touch-detection operation at a lower scanning frequency or a lower scanning density. Thus, whether the control circuits 21A and 21B operate in the normal mode or the power-saving mode may be determined according to the operation being performed by the processing circuit 22.

Figure 5:
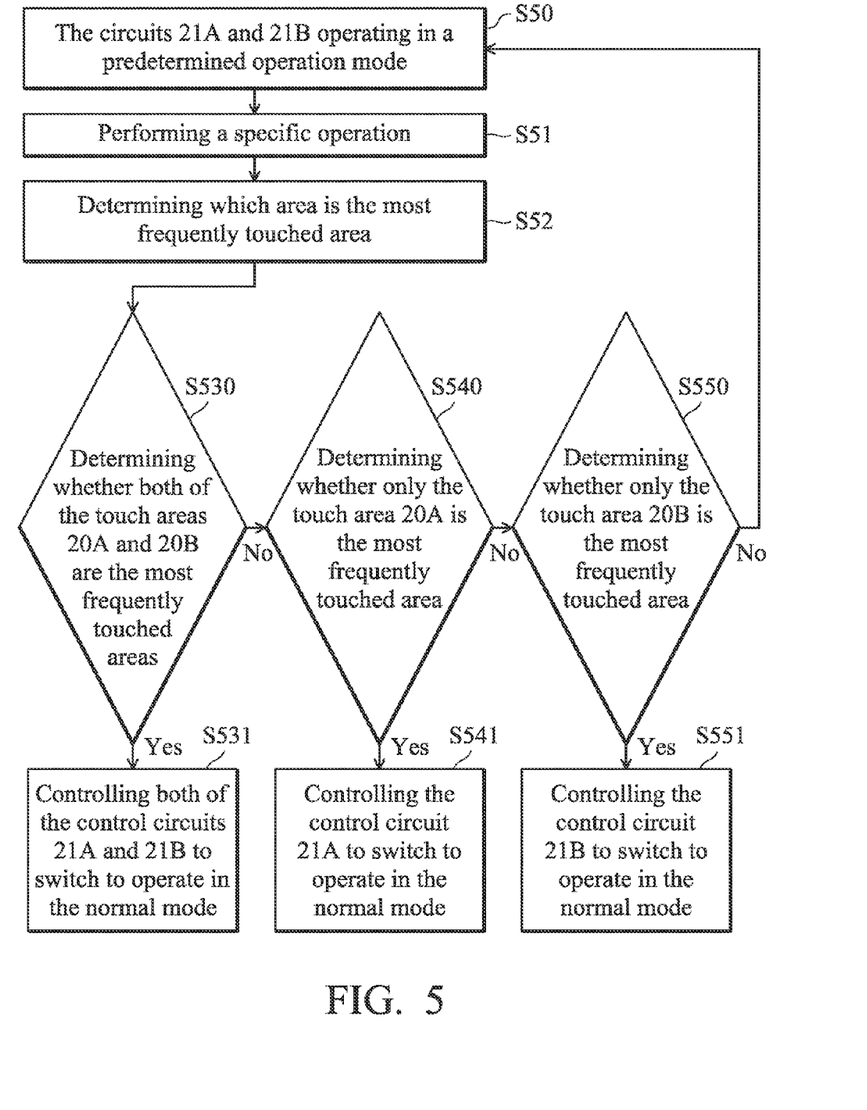
FIG. 5 shows another exemplary embodiment of a control method.

FIG. 5 shows another exemplary embodiment of a control method. The control method is illustrated in FIGS. 3 and 5. The control circuits 21A and 21B operate in a predetermined operation mode (step S50). The processing circuit 22 switches to perform a specific operation (step S51). The predetermined operation mode may be the normal mode or the power-saving mode. That is, both of the control circuits 21A and 21B operate in the normal mode, both of the control circuits 21A and 21B operate in the power-saving mode, or one of the control circuits 21A and 21B operates in the normal mode while the other operates in the power-saving mode. In another case, the predetermined operation mode is the mode which occurs before the processing circuit 22 switches to perform the specific operation. Then, the processing circuit 22 determines which area is the most frequently touched area when the specific operation is being performed (step S52). Then, the processing circuit 22 determines whether both of the touch areas 20A and 20B are the most frequently touched areas (step S530). When the processing circuit 22 determines that both of the touch areas 20A and 20B are the most frequently touched areas, the processing circuit 22 controls the control circuits 21A and 21B, and both of the control circuits 21A and 21B switch to operate in the normal mode (step S531). Accordingly, when the processing circuit 22 is performing the specific operation, control circuits 21A and 21B respectively perform touch-detection operations on the touch areas 20A and 20B at a higher scanning frequency or a higher scanning density.

When the processing circuit 22 determines that both of the touch areas 20A and 20B are the most frequently touched areas, the processing circuit 22 determines whether only the touch area 20A is the most frequently touched area (step S540). When the processing circuit 22 determines that only the touch area 20A is the most frequently touched area, the processing circuit 22 controls the control circuit 21A to switch to operate in the normal mode (step S541). At this time, the control circuit 21B still operates in the power-saving mode. Accordingly, when the processing circuit 22 is performing a specific operation, the control circuit 21A performs the touch-detection operation on touch area 20A by a higher scanning frequency or a higher scanning density, while the control circuit 21B performs the touch-detection operation on the touch area 20B at a lower scanning frequency or a lower scanning density.

When the processing circuit 22 determines that not only he touch area 20A is the most frequently touched area, the processing circuit 22 determines whether only the touch area 20B is the most frequently touched area (step S550). When the processing circuit 22 determines that only the touch area 20B is the most frequently touched area, the processing circuit 22 controls the control circuit 21B to switch to operate in the normal mode (step S551). At this time, the control circuit 21A still operates in the power-saving mode. Accordingly, when the processing circuit 22 is performing a specific operation, the control circuit 21B performs the touch-detection operation on the touch area 20B at a higher scanning frequency or a higher scanning density, while the control circuit 21A performs the touch-detection operation on the touch area 20A at a lower scanning frequency or a lower scanning density.

In other embodiments, the touch device 2 may define one of the touch areas 20A and 20B as the most frequently touched area according to the user's habits. For example, the touch area 20B is defined as the most frequently touched area, while touch area 20A is defined as an infrequently touched area. Accordingly, when the touch device 2 is powered on, the control circuit 21A performs the touch-detection operation on the touch area 20A in the power-saving mode, while the control circuit 21B performs the touch-detection operation on the touch area 20B in the normal mode.

Figure 6:
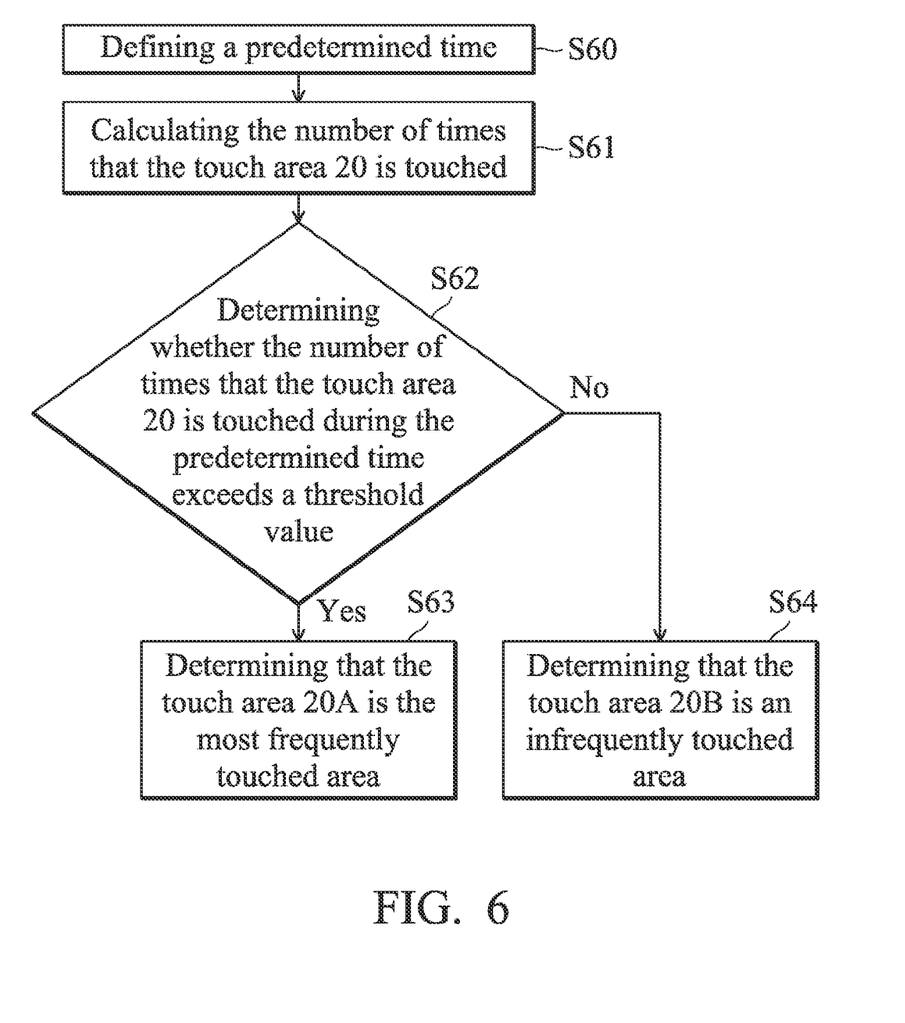
FIG. 6 shows one exemplary embodiment of a method for determining the most frequently touched area.

FIG. 6 shows an exemplary embodiment of a method for determining the most frequently touched areas. Referring to FIGS. 3 and 6, the determination method is performed to determine whether the touch area 20A or the touch area 20B is the most frequently touched area. In the following, a determination is made about whether the touch area 20A is the most frequently touched area. First, the processing circuit 22 defines a predetermined time (step S60). As described above, when a control circuit detects that a touch event occurs at a corresponding touch area, the control circuit generates an interrupt signal to the processing circuit 22. Thus, the processing circuit 22 is capable of calculating the number of times that the touch area 20 is touched according to the number of times that the processing circuit 22 receives the interrupt signal during the predetermined time (step S61). The processing circuit 22 determines whether the number of times that the touch area 20 is touched during the predetermined time exceeds a threshold value (step S62). When the processing circuit 22 determines that the number of times that the touch area 20 is touched during the predetermined time exceeds the threshold value, the processing circuit 22 determines that the touch area 20A is the most frequently touched area (step S63); otherwise, the processing circuit 22 determines that the touch area 20B is an infrequently touched area (step S64). Similarly, the processing circuit 22 is capable of determining whether the touch area 20B is the most frequently touched area by the above steps S61-S64.

According to the above embodiments, the touch panel 20 is divided into several touch areas, and each touch area is controlled by an independent control circuit. Thus, the scanning frequency or the scanning density for each touch area can be controlled dependently. The touch area which is not touch usually touched or is not touched currently is detected through the touch-detection operation performed by the corresponding control circuit in the power-saving mode, thereby decreasing the power consumption and lengthening the standby time of the touch device 2.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch device comprising
a touch panel divided into a first touch area and a second touch area;

a first control circuit coupled to the first touch area and performing a first touch-detection operation on the first touch area;
a second control circuit coupled to the second touch area and performing a second touch-detection operation on the second touch area;
a processing circuit calculating a first number of times that the first touch area is touched and a second number of times that the second touch area is touched during a predetermined time and determining whether the first number of times exceeds a threshold value and whether the second number of times exceeds the threshold value to determine which one among the first and second touch areas is the most frequently touched area, and
wherein when the processing circuit determines that the first touch area is the most frequently touched area, the processing circuit controls the first control circuit to perform the first touch-detection operation in a normal mode and controls the second control circuit to perform the second touch-detection operation in a power-saving mode.

2. The touch device as claimed in claim 1, wherein the first control circuit performs the first touch-detection operation at a first scanning frequency in the normal mode, and the second control circuit performs the second touch-detection operation at a second scanning frequency in the power-saving mode.

3. The touch device as claimed in claim 2, wherein the first scanning frequency is different from the second scanning frequency.

4. The touch device as claimed in claim 2, wherein the first scanning frequency is higher than the second scanning frequency.

5. The touch device as claimed in claim 1,
wherein the touch panel comprises a plurality of scan lines,
wherein the first control circuit is coupled to the scan lines in the first touch area and, in the normal mode, scans the scan lines in the first touch area at a first scanning density during the first touch-detection operation, and
wherein the second control circuit is coupled to the scan lines in the second touch area and, in the power-saving mode, scans the scan lines in the second touch area at a second scanning density during the second touch-detection operation.

6. The touch device as claimed in claim 5, wherein the first scanning density is different from the second scanning density.

7. The touch device as claimed in claim 5, wherein the first scanning density is higher than the second scanning density.

8. The touch device as claimed in claim 1,
wherein the processing circuit is coupled to the first touch circuit and the second touch circuit,
wherein when the first touch circuit detects that one touch event occurs in the first touch area, the first touch circuit generates a first interrupt signal to the processing circuit,
wherein when the second touch circuit detects that one touch event occurs in the second touch area, the second touch circuit generates a second interrupt signal to the processing circuit, and
wherein the processing circuit calculates the first number of times and the second number of times during the predetermined time according to the first interrupt signal and the second interrupt signal, respectively.

9. The touch device as claimed in claim 1,
wherein the first control circuit comprises a first clock generator for generating a first clock signal, and the first control circuit performs the first touch-detection operation according to the first clock signal, and
wherein the second control circuit comprises a second clock generator for generating a second clock signal, and the second control circuit performs the second touch-detection operation according to the second clock signal.

10. The touch device as claimed in claim 1, wherein the first control circuit is packaged independently, and the second control circuit is package independently.

11. A control method for a touch device, comprising
dividing a touch panel of the touch device into a first touch area and a second touch area;
performing a first touch-detection operation on the first touch area through a first control circuit;
performing a second touch-detection operation on the second touch area through a second control circuit;
calculating a first number of times that the first touch area is touched and a second number of times that the second touch area is touched during a predetermined time, and
determining whether the first number of times exceeds a threshold value and whether the second number of times exceeds the threshold value to determine which one among the first and second touch areas is the most frequently touched area;
when it is determined that the first touch area is the most frequently touched area, switching the first control circuit to a normal mode to perform the first touch-detection operation, and further switching the second control circuit to a power-saving mode to perform the second touch-detection operation.

12. The control method as claimed in claim 11,
wherein in the normal mode the first control circuit performs the first touch-detection operation at a first scanning frequency, and
wherein in the power-saving mode, the second control circuit performs the second touch-detection operation at a second scanning frequency.

13. The control method as claimed in claim 12, wherein the first scanning frequency is different from the second scanning frequency.

14. The control method as claimed in claim 12,
wherein the first scanning frequency is higher than the second scanning frequency.

15. The control method as claimed in claim 11,
wherein in the normal mode, the first control circuit performs the first touch-detection operation at to a first scanning density by which scan lines in the first touch area are scanned, and
wherein in the power-saving mode, the second control circuit performs the second touch-detection operation at a second scanning density by which scan lines in the second touch area are scanned.

16. The control method as claimed in claim 15, wherein the first scanning density is different from the second scanning density.

17. The control method as claimed in claim 15,
wherein the first scanning density is higher than the second scanning density.

* * * * *